(12) United States Patent
Park

(10) Patent No.: US 11,123,843 B2
(45) Date of Patent: Sep. 21, 2021

(54) DEPTH ADJUSTABLE HUB FOR USE WITH ABRASIVE GRINDING TOOL

(71) Applicant: GENERAL TOOL, INC., Irvine, CA (US)

(72) Inventor: Joon Ho Park, Irvine, CA (US)

(73) Assignee: GENERAL TOOL, INC., Irvine, CA (US)

( * ) Notice: Subject to any disclaimer, the term of this patent is extended or adjusted under 35 U.S.C. 154(b) by 441 days.

(21) Appl. No.: 15/971,161

(22) Filed: May 4, 2018

(65) Prior Publication Data

US 2018/0339400 A1  Nov. 29, 2018

Related U.S. Application Data

(60) Provisional application No. 62/510,105, filed on May 23, 2017.

(51) Int. Cl.
| | | |
|---|---|---|
| *B24D 7/16* | (2006.01) | |
| *B24B 23/02* | (2006.01) | |
| *B24B 45/00* | (2006.01) | |
| *B24B 55/10* | (2006.01) | |
| *F16B 21/02* | (2006.01) | |

(52) U.S. Cl.
CPC .............. *B24D 7/16* (2013.01); *B24B 23/022* (2013.01); *B24B 45/006* (2013.01); *B24B 55/102* (2013.01); *F16B 21/02* (2013.01)

(58) Field of Classification Search
CPC ....... B24D 7/16; B24B 45/006; B24B 55/102; B24B 23/02; B24B 23/022; F16B 21/02; F16B 21/04

USPC ....... 451/177, 210, 259, 353, 358, 359, 360, 451/362
See application file for complete search history.

(56) References Cited

U.S. PATENT DOCUMENTS

| | | | | |
|---|---|---|---|---|
| 3,912,411 A | * | 10/1975 | Moffat | B24B 45/006 403/259 |
| 5,263,283 A | * | 11/1993 | Rudolf | B25F 3/00 451/342 |
| 5,400,461 A | * | 3/1995 | Malish | A47L 11/162 15/230 |
| 5,619,770 A | * | 4/1997 | Bell | A47L 11/164 15/230 |
| 5,897,170 A | * | 4/1999 | Keleny | A63C 17/223 152/323 |

(Continued)

FOREIGN PATENT DOCUMENTS

| | | |
|---|---|---|
| DK | 2016 70390 A1 | 5/2017 |
| WO | WO 2017/207007 A1 | 12/2017 |

OTHER PUBLICATIONS

International Search Report for Application No. PCT/US2018/031755, dated Oct. 1, 2018.

(Continued)

*Primary Examiner* — Orlando E Aviles
*Assistant Examiner* — Joel D Crandall
(74) *Attorney, Agent, or Firm* — Birch, Stewart, Kolasch & Birch, LLP.

(57) ABSTRACT

An abrasive finishing article with an adapter or hub to attach to an appropriate power tool, wherein the hub contains sets of slots to receive ribs positioned on a grinding wheel to permit adjustment of the height of the hub to change the overall height of the grinding wheel and abrasive finishing article.

9 Claims, 5 Drawing Sheets

(56) References Cited

U.S. PATENT DOCUMENTS

| | | |
|---|---|---|
| 7,596,872 B2 | 10/2009 | Clarke et al. |
| 2008/0132158 A1 | 6/2008 | Patrello |
| 2009/0311041 A1 | 12/2009 | Sockman et al. |

OTHER PUBLICATIONS

Notification of Transmittal of the International Search Report and the Written Opinion of the International Searching Authority for Application No. PCT/US2018/031755, dated Oct. 1, 2018.
Written Opinion of the International Searching Authority for Application No. PCT/US2018/031755, dated Oct. 1, 2018.

\* cited by examiner

DEPTH ADJUSTABLE HUB FOR USE WITH ABRASIVE GRINDING TOOL

CROSS REFERENCE TO RELATED APPLICATIONS

This non-provisional application claims the benefit under 35 U.S.C. § 119(e) to U.S. Provisional Application No. 62/510,105, filed on May 23, 2017, all of which are hereby expressly incorporated by reference into the present application.

FIELD OF THE INVENTION

The invention relates to abrasive finishing article with an adapter or hub to attach to an appropriate power tool. More specifically, the invention provides a hub to permit adjustment of the height of the hub to change the overall height of the abrasive finishing article and for the hub to be detached through a rotating motion.

BACKGROUND OF THE INVENTION

Abrasive grinding devices are commonly used to grind the surface of various materials. Many times these devices create harmful dusts that must be removed using a dust shroud/vacuum combination. But the height of the grinding device limits which dust shroud can be used because the two may not fit due to their height difference. The dust shroud must create a seal with the workpiece for optimal suction of dust. If the grinding device is taller than the dust shroud coverage area, then the dust will simply escape from the lack of the seal. If the grinding device is shorter than that of the dust shroud, then the dust shroud will create a seal with the workpiece but the grinding device will be unable to touch the workpiece and grind. Creating the optimal seal between the dust shroud and the workpiece involves altering the height of the dust shroud or the grinding device.

Many grinding devices are created in a fixed height that matches the necessary height for the dust shroud to overcome the height difference between the dust shroud and the grinding device. However, there are many manufacturers of dust shrouds and thus the height of dust shrouds vary. And even though the grinding apparatus may fit with the dust shroud, the grinding apparatus can become worn, which alters their overall height. This causes the grinding apparatus to no longer work with the dust shroud due to the height difference.

To overcome this height difference it is desirable to have the option to change the overall height of the grinding device itself. By doing so, one grinding device can be made to fit multiple dust shrouds and change its height based on its wear. There are removable hubs on many grinding devices, but multiple hubs are required to adjust the height as one hub is associated with only one height. The hubs are also time consuming to remove as the grinding device must be removed from the power tool and the hubs must be screwed off and replaced.

Therefore, there is a need for a hub that allows for a simpler and faster method of height adjustment for grinding devices which overcomes the drawbacks of prior art.

SUMMARY OF THE INVENTION

The present invention utilizes a locking mechanism for the hub to attach and detach from the grinding device. For definitional purposes, the grinding cup without its hub will be called the body. The hub rests in the center of the grinding device and has appropriate slots to attach to the body. The hub of the invention attaches by rotating towards the direction of the spin created by the power tool. In the central area of the grinding device is a hole with the same dimensions as the hub and ribs that fit with the slots in the hub. The ribs have fillets on its sides to create a low area of stress which ultimately increases its ability to withstand higher shear forces.

The hub has a plurality of slots positioned in sets to correspond to the spacing of the ribs. The slots are used in unison and form at least two sets of slots wherein each set correspond to one desired depth of the hub. The overall depth of the set of slots is different for each set which creates the height adjustability for the grinding device. The number of slots and the depth of the slots can be altered during production to allow for a wide range of hubs with different height adjustability. At the end of the slot depth, there are cavities on one side of the slot walls in a circular fashion for all slots. The slots and cavities are shaped to fit the ribs on the grinding device aperture. The ribs and cavities/slots fit snuggly with the ribs for a mechanical locking function.

After the ribs are inserted into the hub, the ribs slide into the cavities of the hub through rotation of the grinding device while the hub is fixed. The ribs in this position can only move towards the opposite direction of the initial rotation which is also the opposite rotating direction when the grinding device is in use. By rotating the grinding device in this direction opposite to the rotation during use, the grinding disc is free to move upwards and be the ribs are able to be removed from the hub. The grinding device then can be rotated to line up its ribs on another set of slots in the hub which changes the overall height of the grinding device and hub combination.

The above and other features and advantages of this invention are more apparent from reading the following detailed description of the various parts and aspects of the invention taken in conjunction with the accompanied drawings.

DETAILED DESCRIPTION OF THE INVENTION

Figure 1:
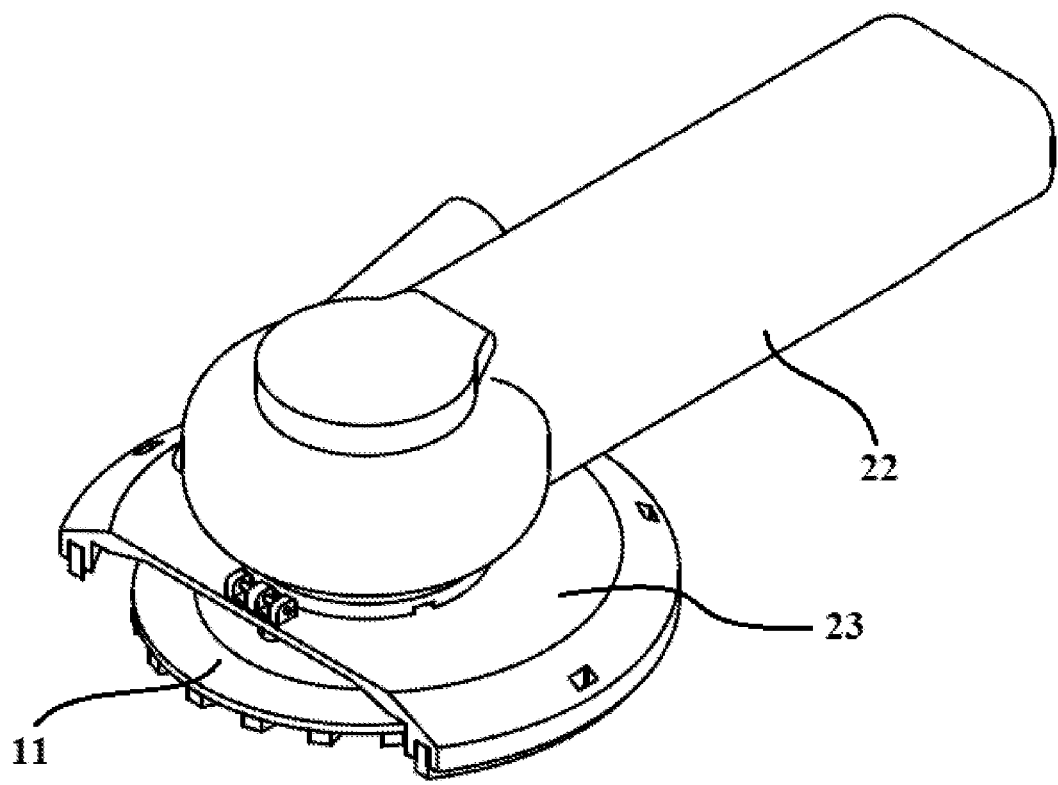
FIG. 1 is a perspective view of an example grinding tool and associated dust shroud.
Figure 2:
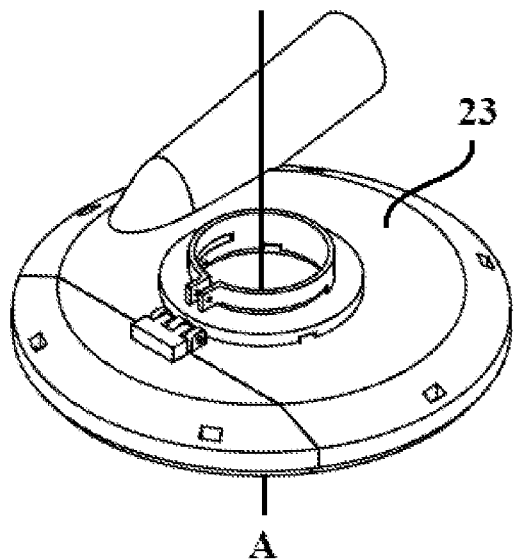
FIG. 2 is a perspective view of an example dust shroud that is used with a grinding tool that can incorporate the hub of the invention.
Figures 3A, 3B:
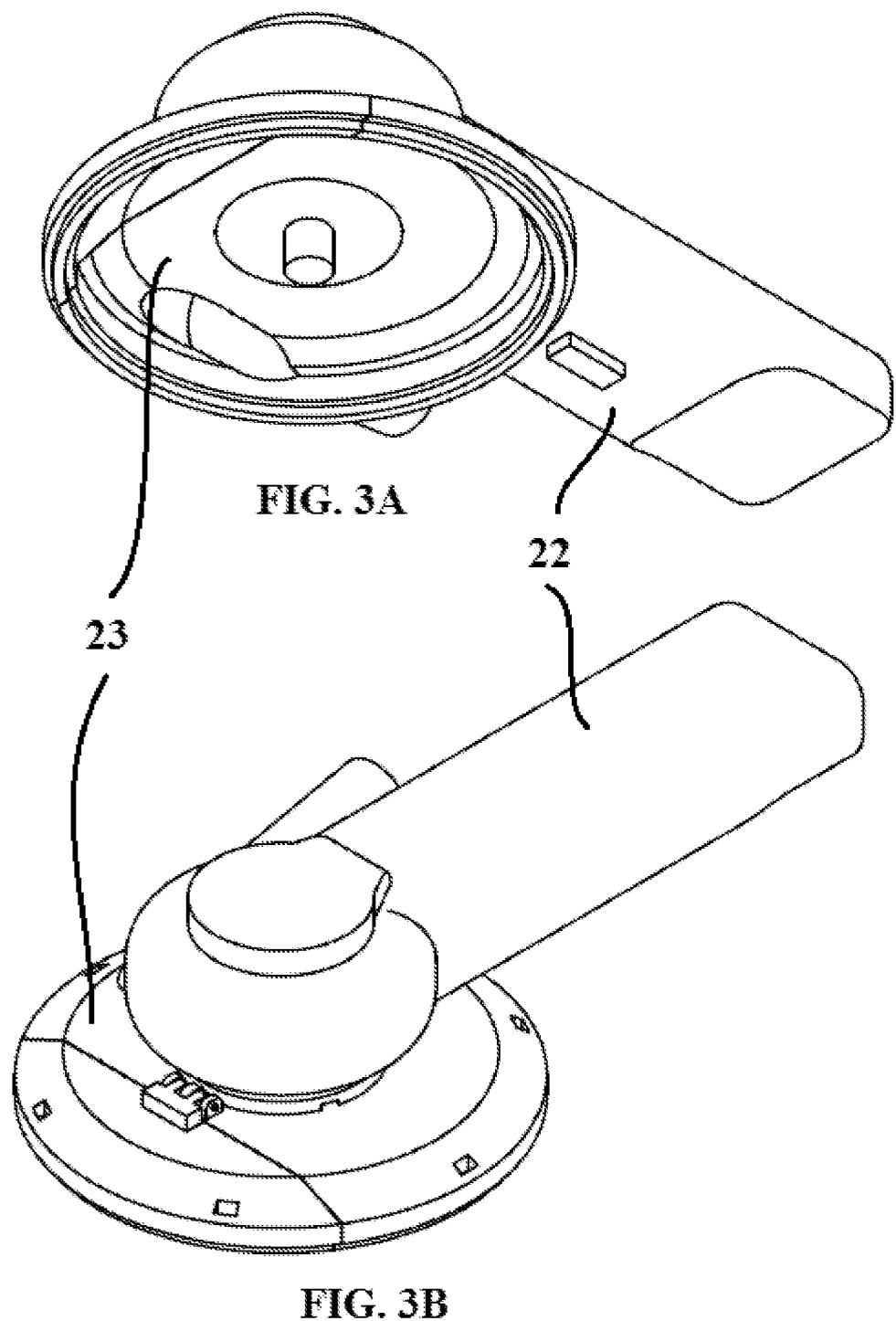
FIGS. 3A and 3B are perspective views of an example dust shroud that is used with a grinding tool that can incorporate the hub of the invention.

As shown in FIG. 1, a grinding tool device generally comprises a rotary tool 22 that is associated with a grinding cup 11 surrounded by a protective housing, such as a dust shroud 23 like the one depicted in FIGS. 2, 3A and 3B.

Figure 4:
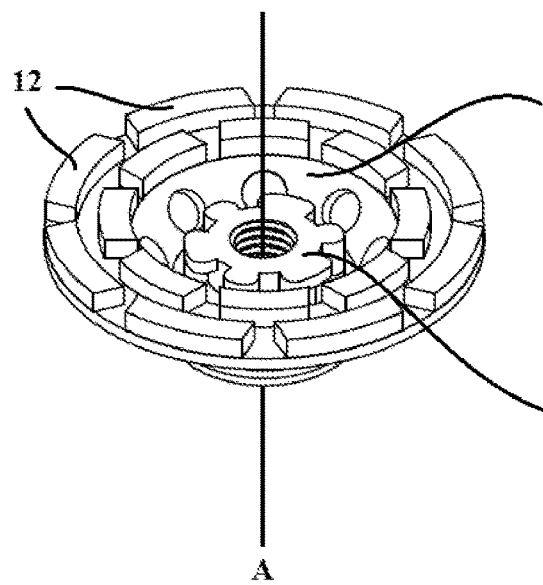
FIG. 4 is an isometric view of the grinding device with the hub attached to a grinding wheel.

According to the present invention, as shown in FIG. 4, the grinding device of the present invention comprises a grinding wheel 11 and associated wheel hub 10. The grinding wheel 11 comprises a plurality of grinding segments 12, such as metal and/or diamond containing segments, which are used to grind or polish a surface, such as a concrete surface.

Figure 5:
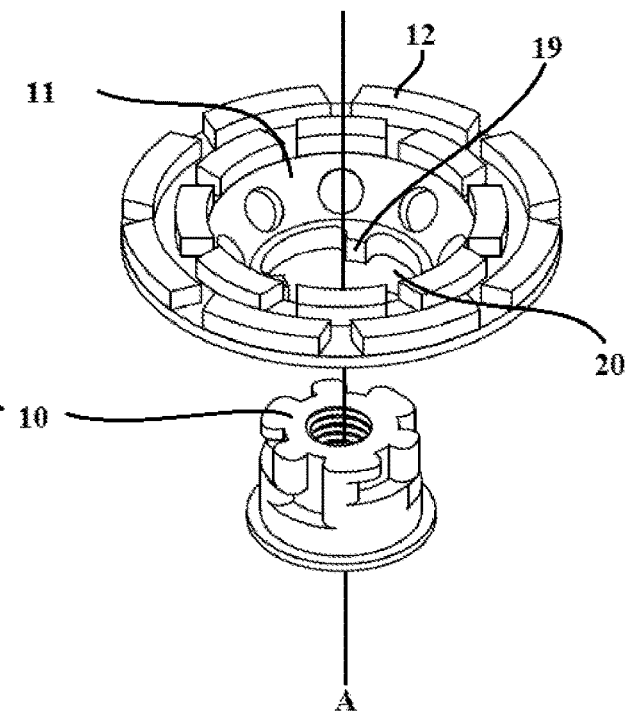
FIG. 5 is an isometric view of a grinding device with the hub unattached to a grinding wheel.
Figure 6:
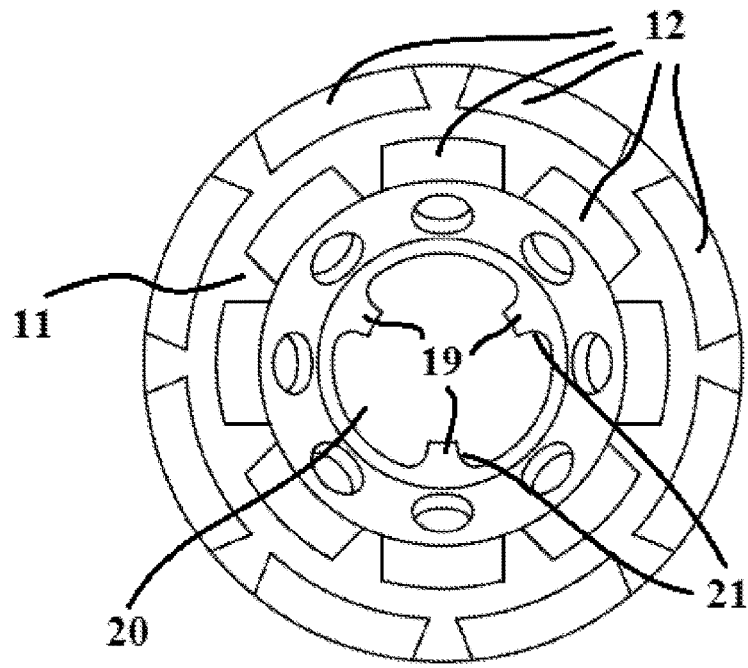
FIG. 6 is a top view of the grinding wheel alone.

As shown in FIGS. 5 and 6, the grinding wheel 11 includes a plurality of ribs 19 (such as two or more or three or more) that extend from the aperture 20 of the wheel towards the center of the wheel. The hub 10 is attached to the wheel 11 by inserting the hub 10 into the wheel aperture 20 and lining up the ribs 19 on the wheel 11 with the appropriate slots 13 on the hub 10. The complete assembly providing a grinding device can be seen in FIG. 5.

Figure 8:
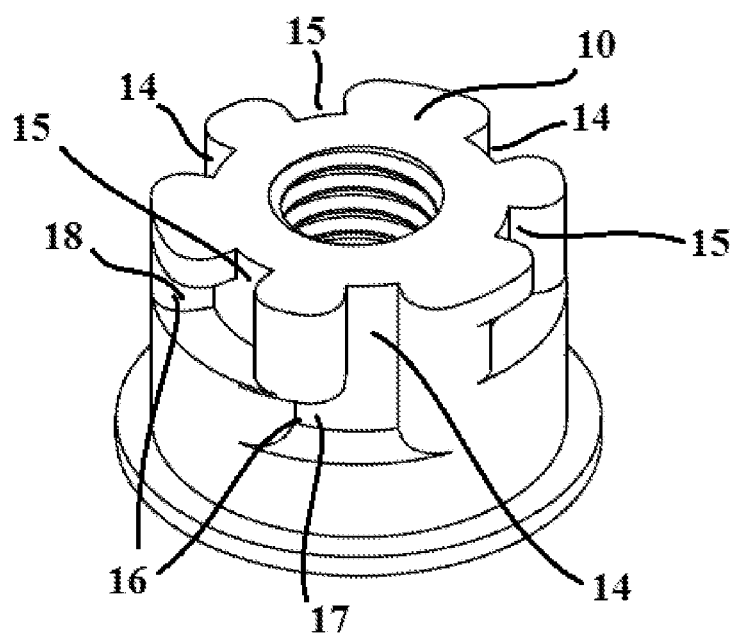
FIG. 8 is a perspective view of the hub of the invention.

The ribs 19 extrude from the aperture 20 of the wheel body 11 towards the center, with the number of ribs corresponding to the number of slots 13 in each set of slots in the hub 10. Referring to FIG. 8 (and FIG. 4), the slots 13 comprise a cavity portion 16, substantially perpendicular to the rotational axis A, that allows for the ribs 19 to enter and lock into place as the grinding device is rotated along the axis A. The required rotating direction can be changed by altering the location of the slots 13 and cavities 16. The Figures show slots and cavities placed such that the necessary rotation direction for locking is in the clockwise direction looking from the top (FIG. 4). To remove the grinding wheel 11 from the hub 10, the wheel 11 rotates counterclockwise to free the ribs 19 from the cavities 16. Then the body 11 is pulled up to free it from the slots 13. This design allows for the ribs 19 to move in only one direction (counterclockwise) when it is inside the cavities.

Figure 7:
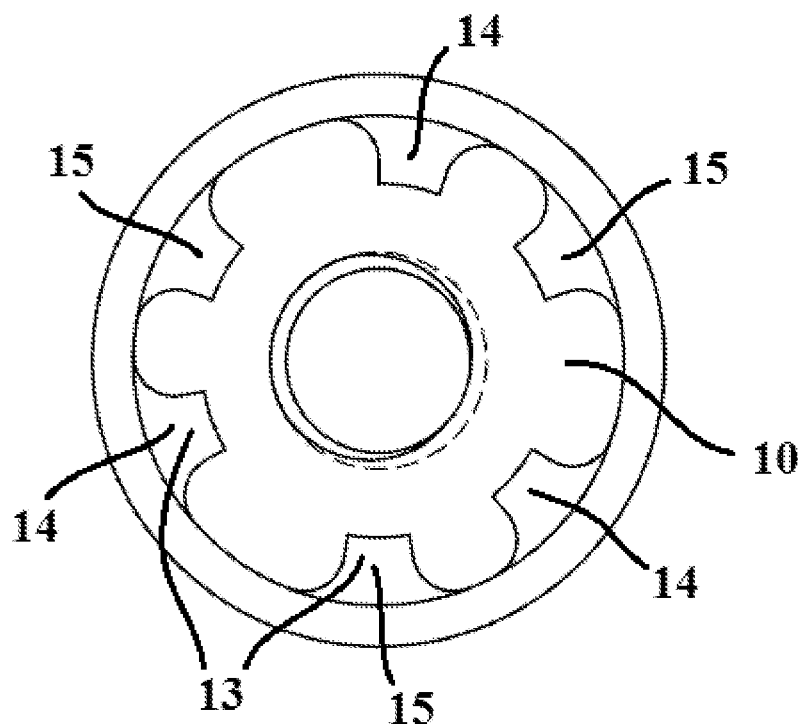
FIG. 7 is an enlarged top view of the hub alone.
Figures 9, 10:
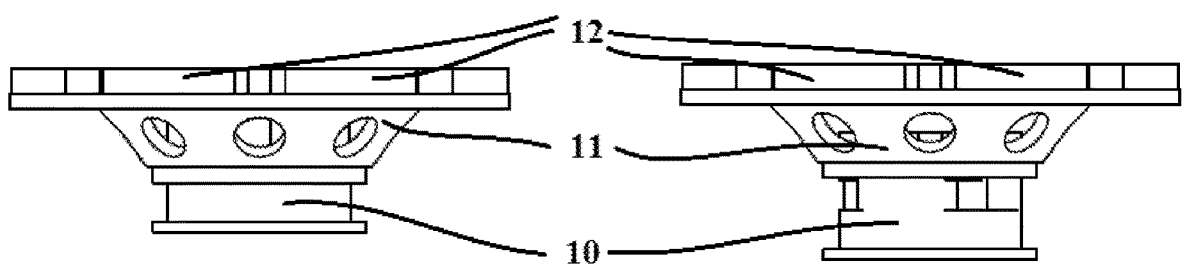
FIG. 9 is a side view of the grinding device with the grinding wheel attached to the hub at the lower depth position.
FIG. 10 is a side view of the grinding device with the grinding wheel attached to the hub at the higher depth position.

In the embodiment shown in the Figures, there are a total six slots 13 on the hub 10, each having a vertical portion 14 or 15 (see particularly FIGS. 4 & 8), spread throughout the top surface of the hub 20 extending down to a fixed height to the cavities 16. As shown, each of the two sets of slots consists of three slots used in conjunction with one another and evenly spaced out along the circular face of the hub (FIGS. 7 & 8). Each slot extends toward the bottom of the hub and terminates as it reaches the required depth. The depth difference between the different set of slots can be seen on FIGS. 7 & 8. The slots 15 immediately adjacent are placed in that particular location so that the cavities do not interfere with the vertical portion 14 of the slots. The vertical slot portions 14 have cavities 17 that intersect the shallow slot 15 if the deep slot 14 has had the same height as the shallow slot 15. Because of this, it is important to position the slots 13 and cavities 16 so that they do not intersect. When the ribs 19 are positioned to fit the vertical deep slot portion 14, then the overall height of the grinding cup/hub assembly is in its low position (FIG. 9). If in the shallow vertical slot portion 15, then the assembly is in the high position (FIG. 10). The diameter of the hub 10 can also be changed to fit different applications. A larger diameter can allow for the hub 10 to be given a greater number of slots 13 with each of the sets of slots differing in depth.

Referring to FIG. 5, the top of a grinding device as shown comprises a general grinding cup with two rows of metal segments 12, totaling 16 segments. According to this embodiment of the grinding device, the ribs 19 extrude from the inner annular aperture 20. The tips of the rib 19 are radial with its central point being the same as the central point of the inner aperture. The radial shape of the tip allows for the ribs 19 to rotate along the axis of the circular shape of the hub 10. The three ribs 19 are also evenly spaced out along the aperture 20.

The slots 13 and cavities 16 have predetermined dimensions for the necessary overall height of the grinding device and to match the shape of the ribs 19, which can be designed to employ fillets, as shown in FIG. 6. Use of filleted ribs 19 instead of ribs with sharp edges will increase strength and avoid stress fractures, thereby increasing durability and permitting the ribs to withstand higher loads. The thickness, width of the ribs can be altered to create different specifications such as strength, number of ribs, and number of slots on the hub. The size of the fillets 21 can also be varied. Altering the overall shape and size of the ribs 19 allows the slots 13 to become different. This allows for more slots 13 to be added to the hub 10 such that the hub may have multiple levels of depth control. Each set of slots 13 can be given a specific required depth by varying the height/depth of the respective vertical portion of the cavities.

The hub 10 can be used on grinding wheels of different shape and sizes so that the hub can be part of a different type of grinding device. As long as a grinding wheel has ribs as described above, the hub 10 of the invention can act as a universal hub/adapter. Usually, the body of the grinding device wears out much more quickly than the hub/arbor. This invention allows for the hub to be removable and thus can be reused for different grinding wheels 11.

For a grinding wheel with metal segments 12 as shown in the Figures, the segments 12 are worn out during use and reduce the overall height of the grinding device. The change in the overall height causes the grinding device to be unfit for a power tool or the dust shroud and the height difference between the dust shroud and the grinding device will cause uneven grinds. With the adjustability of this invention, the height of the grinding device can be adjusted to counteract the wear of the segment 12. This allows for more segments to be fully used before the necessary replacement of the grinding device.

Hub 10 may be fabricated from any number of materials capable of providing the requisite structural characteristics, such as, for example, a metallic material or alloy and plastic polymers. In one embodiment, hub 10 is fabricated from a steel alloy of relatively high zinc content.

The grinding wheel is manufactured similarly to that of the hub. The ribs 19 can be machined or formed during a molding process. The ribs 19 can also be manufactured separately and attached to the allocated spot in the aperture inside the body 20 through welding, brazing, or other metal-to-metal bonding methods.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

The invention claimed is:

1. A grinding device comprising a grinding wheel and wheel hub:
   a. said hub comprising at least two sets of slots, each set comprising at least two slots and said sets being positioned on said hub at different depths from one another to provide adjustable height control for said grinding wheel;
   b. said grinding wheel comprising a plurality of ribs extending radially and inwardly from a central aperture of said wheel, whereby said ribs are capable of cooperating in said slots to lock and unlock said wheel and hub through rotational movement of said hub relative to said grinding wheel; wherein said hub includes a top surface and a rotational axis, and said slots include a vertical portion substantially parallel to said rotational axis for initially receiving said ribs and a cavity portion substantially horizontal relative to said vertical portion of said slots for receiving and locking said ribs in place as said grinding wheel is rotated along said rotational axis and, wherein, the vertical portion of said slots extends from the top surface of said hub to said cavity portion of said slots.

2. The grinding device as set forth in claim 1, wherein said hub slots are shaped to fit said ribs.

3. The grinding device as set forth in claim 1, wherein said hub comprises two sets of three slots, said sets of slots being positioned apart from one another a distance along said rotational axis to permit aligning the ribs in either of the two sets of slots and locking the ribs into the cavities through rotation along said rotational axis.

4. The grinding device as set forth in claim 1, wherein said hub comprises more than two sets of slots to allow for multiple depth options.

5. The grinding device as set forth in claim 4, wherein each set of slots consists of three slots.

6. The grinding device as set forth in claim 1, wherein said ribs comprise a tip having a radial surface to allow for the tip to spin along the axis of the circular face of the hub.

7. A wheel hub capable of being in cooperation with a grinding wheel for use in a grinding device, said hub comprising at least two sets of slots, each set comprising at least two slots and said sets being positioned on said hub at different depths from one another to provide adjustable height control for a grinding wheel; wherein said hub includes a top surface and a rotational axis, and said slots include a vertical portion substantially parallel to said rotational axis for initially receiving said ribs and a cavity portion substantially horizontal relative to said vertical portion of said slots for receiving and locking said ribs in place as said grinding wheel is rotated along said rotational axis and, wherein, the vertical portion of said slots extends from the top surface of said hub to said cavity portion of said slots.

8. The hub as set forth in claim 7, wherein said hub comprises two sets of three slots, said sets of slots being positioned apart from one another a distance along said rotational axis to permit aligning the ribs in either of the two sets of slots and locking the ribs into the cavities through rotation along said rotational axis.

9. The hub as set forth in in claim 7, wherein said hub comprises more than two sets of slots to allow for multiple depth options.

* * * * *